Figure 1:
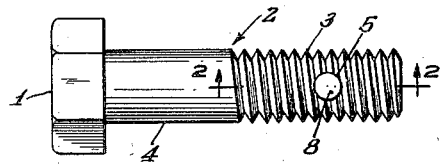

Jan. 30, 1951  E. R. BOOTS  2,539,887

SELF-LOCKING BOLT

Filed Jan. 26, 1949

INVENTOR
EDMUND R. BOOTS

BY
George T. Gill
ATTORNEY

Patented Jan. 30, 1951

2,539,887

UNITED STATES PATENT OFFICE 2,539,887

SELF-LOCKING BOLT

Edmund R. Boots, Short Hills, N. J., assignor to The Nylok Corporation, New York, N. Y., a corporation of Delaware Application January 26, 1949, Serial No. 72,849

2 Claims. (Cl. 151—7)

The invention herein disclosed relates to a self-locking screw or bolt of the kind in which a resilient or elastic element, forming a part of the screw or bolt, exerts in engagement with the thread of an internally threaded element, a lateral thrust to effect a frictional engagement between the thread thereof and the thread of the internally threaded element, such, for example, as disclosed in my copending application, Serial No. 580,387 filed March 1, 1945, for Threaded Locking Device (issued as Patent No. 2,462,603, Feb. 22, 1949), of which this application is a continuation in part.

A self-locking bolt embodying the invention is illustrated in the accompanying drawing and described in detail below, from which description a clear understanding of the invention may be had.

Figure 2:
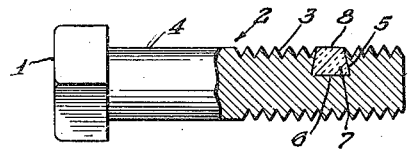
Figure 3:
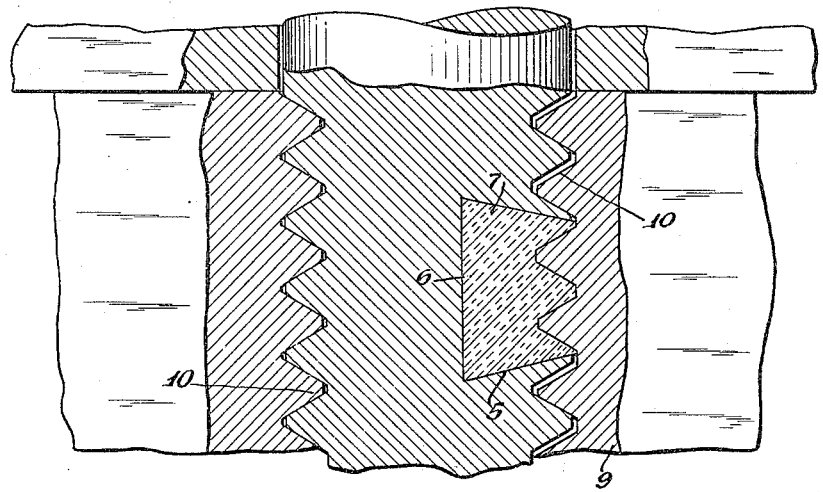

The drawing includes:

Fig. 1 which is a side elevation of a bolt embodying the invention;

Fig. 2 which is a sectional elevation of the same taken on the line 2—2 of Fig. 1; and Fig. 3 which is a fragmentary, axial section, on enlarged scale, of the same and illustrating the bolt in threaded engagement with an internally threaded element.

In general, a bolt embodying the invention includes an externally threaded shank having a recess extending through the thread and into the body of the shank. Within the recess, there is an elastic or resilient, deformable insert or plug which is engaged at its inner end and extends outwardly beyond the root diameter of the thread. When the bolt is threaded into an internally mating, threaded element, the resilient insert, on engaging the thread of the mating threaded element, is compressed and due to its resiliency exerts a lateral thrust, a thrust transverse to the axis of the bolt, to cause the threads of the bolt and the internally threaded element, to engage in wedging, surface, frictional contact opposite the insert. The term bolt is used herein in a general sense to signify an externally threaded member.

In the accompanying drawing, the invention is illustrated as it is embodied in a bolt that consists of a hexagonal head 1 and a shank 2. The shank includes an externally threaded portion 3 and an unthreaded portion 4, intermediate the threaded portion 3 and the head 1. In the threaded portion 3 an opening 5 is formed. The opening 5 extends through the thread and into the shank, substantially radially thereof. The particular opening illustrated is tapered, the wall thereof being frustro conical and tapering or converging from the base or inner end 6 of the opening toward the opening through the thread.

An insert or plug 7 of resilient material is inserted in the opening 5. Desirably, the plug 7 is of a resilient or elastic material that is resiliently deformable, and self-recoverable within limits, when compressed. The insert 7, initially, is a solid cylindrical plug of a diameter to be forced into the opening 5 to the inner end or wall 6 of the opening. The plug is of such length that it engages the base 6 of the opening and extends to a point beyond the root diameter of the thread, preferably such that the outer, flat face or end 8 of the plug is substantially tangential to the curvature of the thread at the major or crest diameter of the thread. A cylindrical plug inserted in the tapering or frustro-conical opening 5 does not, initially, necessarily fill the opening, there is a tapering space between the side wall of the recess and the plug, tapering from the base of the recess to the opening where the plug makes a forced fit.

When threaded into a mating, internally threaded element, such as a nut or drilled and tapped structural element 9 having an internal mating thread 10, the mating thread 10 is forced into the extended end of the insert 7 and displaces the material thereof. Since the material of the insert 7 is elastic or resilient, it produces a resilient reactive force upon compression and deformation by the thread 10. This reactive force exerts a thrust, laterally of, or transverse to the axis of the bolt so that the tolerances in pitch diameter of the mating threaded elements is taken up opposite the insert and the mating threads are forced into wedging, surface frictional contact. This condition is illustrated in Fig. 3 of the drawing wherein, at the left, the thread of the bolt and the thread 10 of the internally threaded, structural element 9 are in wedging, surface frictional contact. At the right, the threads of the two elements are shown as spaced and illustrate the "take up" of the tolerances in pitch diameter. The surface frictional engagement effected by such wedging action is sufficient to resist loosening torques exerted by virtue of vibration and shock ordinarily encountered in service.

Many and various materials, including metals and plastics, are suitable for the insert 7. The rapidity of recovery and the elasticity or resiliency of the material selected are important. Other factors include the temperature to which the bolt will be subjected in service. However, it has been determined that for ordinary use at normal temperatures the material known as nylon gives excellent results. By the term nylon is meant a synthetic linear polyamide such as, for example, the material disclosed in United States Patent No. 2,130,948, issued September 30, 1938.

From the foregoing description of the embodiment of the invention illustrated in the drawing and described above, it will be apparent to those skilled in the art that by this invention there is provided a self-locking screw or bolt that effectively secures, by affecting a frictional engagement between its thread and the thread of a mating internally threaded element, the bolt against loosening by virtue of forces acting thereon and resulting from vibration and shock ordinarily encountered in service; a self-locking screw or bolt that is comparatively inexpensive to manufacture; and a self-locking screw or bolt in which the pull strength is not substantially lessened.

It will be obvious that various changes may be made by those skilled in the art in the details of the embodiment of the invention illustrated in the drawing and described above within the principle and scope of the invention as expressed in the appended claims.

I claim:

1. A self-locking bolt comprising a threaded shank, the threaded portion of said shank being provided with a hole having closed bottom and side walls extending radially inwardly from one side only of the threaded shank, the threads on the opposite side being continuous, said hole extending radially inwardly into the shank beyond the roots of the threads for a substantial distance, and a plug of resilient deformable plastic material having a high rate of recovery from compression, mounted in said hole, and confined by the side and bottom walls thereof, the exposed face of said plug being substantially flat and extending substantially to the crest of the interrupted bolt threads, into the path of the threads of a cooperating female element, the female threads of the mating element in use compressing strongly into the entire exposed face of said plug, said female threads contacting and deforming substantially the entire plug face along the entire plug contacting surface of the said female threads, the reactive force of such compression serving to force the bolt and mating element laterally in opposite directions, so that the mating metallic threads of the bolt and mating element opposite said plug are forced into each other laterally, for thereby jamming together such interengaged metallic surfaces of the threads with a mutual wedging action to effect tight frictional engagement thereof.

2. A self-locking bolt as claimed in claim 1, wherein said plug is made of a synthetic linear polyamide known commercially as nylon.

EDMUND R. BOOTS.

REFERENCES CITED

The following references are of record in the file of this patent:

UNITED STATES PATENTS

| Number | Name | Date |
|---|---|---|
| 990,732 | Harper | Apr. 25, 1911 |
| 2,390,759 | Warren | Dec. 11, 1945 |
| 2,398,838 | Miller | Apr. 23, 1946 |
| 2,421,105 | Warren | May 27, 1947 |
| 2,462,603 | Boots | Feb. 22, 1949 |
| 2,520,121 | Brutus | Aug. 29, 1950 |

FOREIGN PATENTS

| Number | Country | Date |
|---|---|---|
| 496,638 | Great Britain | Dec. 2, 1938 |
| 504,853 | Great Britain | May 2, 1939 |